United States Patent [19]

Sauron et al.

[11] Patent Number: 4,867,636
[45] Date of Patent: Sep. 19, 1989

[54] DEVICE FOR CONTROLLING AND SYNCHRONIZING THE GUIDE VANES OF A DISTRIBUTOR OF HYDRAULIC MACHINES, PARTICULARLY OF TURBINES

[75] Inventors: Albert Sauron, Seyssins; Jacques Bremond, Pone de Claix, both of France

[73] Assignee: Societe NEYPRIC, Grenoble, France

[21] Appl. No.: 228,576

[22] Filed: Aug. 5, 1988

[30] Foreign Application Priority Data

Aug. 18, 1987 [FR] France .............................. 87 11786

[51] Int. Cl.4 .............................................. F03B 3/18
[52] U.S. Cl. .......................................... 415/160; 415/9
[58] Field of Search .................. 415/9, 150, 160, 161, 415/162, 163, 164

[56] References Cited

U.S. PATENT DOCUMENTS

| | | | |
|---|---|---|---|
| 1,688,808 | 10/1928 | Gill | 415/160 X |
| 2,277,255 | 3/1942 | Rudert et al. | 415/163 |
| 2,428,830 | 10/1947 | Birmann | 415/163 X |
| 2,606,713 | 8/1952 | Bauger | 415/160 |
| 3,089,679 | 5/1963 | Henny | 415/160 |
| 4,264,270 | 4/1981 | Geary, Jr. | 415/164 |

FOREIGN PATENT DOCUMENTS

| | | | |
|---|---|---|---|
| 1354691 | 1/1964 | France. | |
| 55-1475 | 1/1980 | Japan | 415/9 |

Primary Examiner—Robert E. Garrett
Assistant Examiner—Joseph M. Pitko
Attorney, Agent, or Firm—Dowell & Dowell

[57] ABSTRACT

This invention relates to a device for controlling and synchronizing the guide vanes of a distributor of hydraulic machines, particulalry of turbines, which comprises ramps borne by spaced apart radial tabs secured with the synchronization ring. Each lever fitted angularly on the journal of each guide vane presents a free end which cooperates with the corresponding ramp by a roller. The profile of the guide vanes is such that the hydrodynamic force tend to close them.

5 Claims, 4 Drawing Sheets

DEVICE FOR CONTROLLING AND SYNCHRONIZING THE GUIDE VANES OF A DISTRIBUTOR OF HYDRAULIC MACHINES, PARTICULARLY OF TURBINES

BACKGROUND OF THE INVENTION

1. FIELD OF THE INVENTION

The present invention relates to a device for controlling the guide vanes of the distributor of hydraulic machines and more particularly to the connection between the guide vanes and the member for controlling their orientation.

2. History of the Related Art

It will be recalled that a distributor of the above type is constituted by a variable number of guide vanes or blades sectioned like aircraft wings and associated with a slewable journal so that the assembly thereof is actuated synchronously by the common control member mentioned above. The latter is generally a gating ring which homogeneously varies the angle of inclination of the guide vanes. The guide vanes serve to supply water to a wheel over the whole of its periphery, as is well known in the art. The variation of the angle of inclination of the guide vanes causes a change in the admission flowrate of the water and varies the approach angle on the wheel. This assembly is governed by the speed regulator which maintains the unit at the speed of synchronism whatever the flowrate and pressure head.

The present arrangement of such a distributor device includes a system of connecting rods and cranks actuated by the control member, which system acts on a lever fitted angularly on the journal of the guide vane.

In the event of effort upon closure of the distributor, for example when an obstacle slips between two guide vanes, any manoeuvring effort is transferred onto the blocked guide vane. A fusible or break element has therefore been provided which avoids overcouples which might in that case damage the distributor.

In the event of break of the element in question, an out-of-step of the corresponding guide vane is produced, with the result that the supply of the hydraulic machine is disturbed. Manual intervention is then necessary, i.e. at the gating ring to change the fusible element.

In order partially to overcome this drawback, FR-B-1354691 for example teaches producing the lever in two parts and joining these two parts by an elastic element. However, although this system is satisfactory for small efforts, it does not prevent the use of a fusible element which breaks under high efforts.

SUMMARY OF THE INVENTION

The improvements forming the subject matter of the present invention aim at overcoming the drawbacks of the prior art and at producing a device for controlling the orientation of the guide vanes of a distributor of hydraulic machines which is of simplified construction and with improved functioning.

In fact, as it is becoming more and more necessary, due to the requirements of specification sheets, to effect automatic resynchronization of the distributor in the event of mishap, Applicants have undertaken studies which have enabled the problem thus raised to be solved. It should be said that this solution was facilitated by the general technical tendency to draw the outline of the profile of the guide vanes so that they tend to close under the effect of the hydrodynamic forces applied thereon. It may thus be imagined that this tendency to close is obtained by outside elements such as springs, counterweights, jacks, etc.

The object of the invention is obtained by a synchronization ring comprising as many ramps as guide vanes, by causing the free end of each lever to cooperate with the corresponding ramp of the ring, while, in operation, the guide vanes tend to close.

In a preferred embodiment, the periphery of a roller mounted idly on a shaft carried by the end of the connecting rod cooperates with the ramp of the gating ring.

Each ramp is constituted by the edge of a tab secured with the gating ring and extending radially from the periphery of this ring.

BRIEF DESCRIPTION OF THE DRAWINGS

The invention will be more readily understood on reading the following description with reference to the accompanying drawings, in which.

These two Figures illustrate the prior art.

Figure 1:
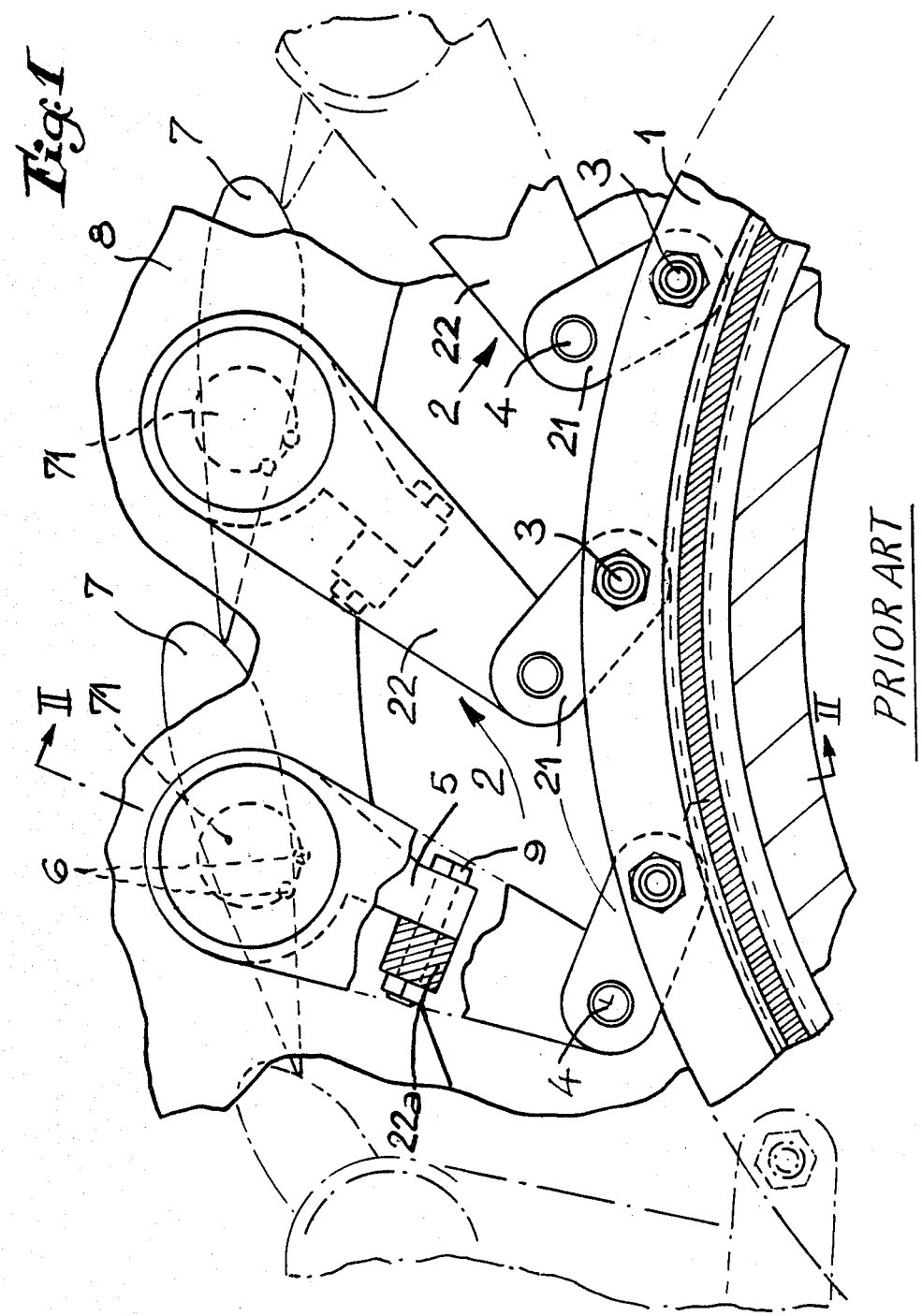
FIG. 1 is a partial plan view with parts broken away of a conventional distributor of a hydraulic machine.
Figure 3:
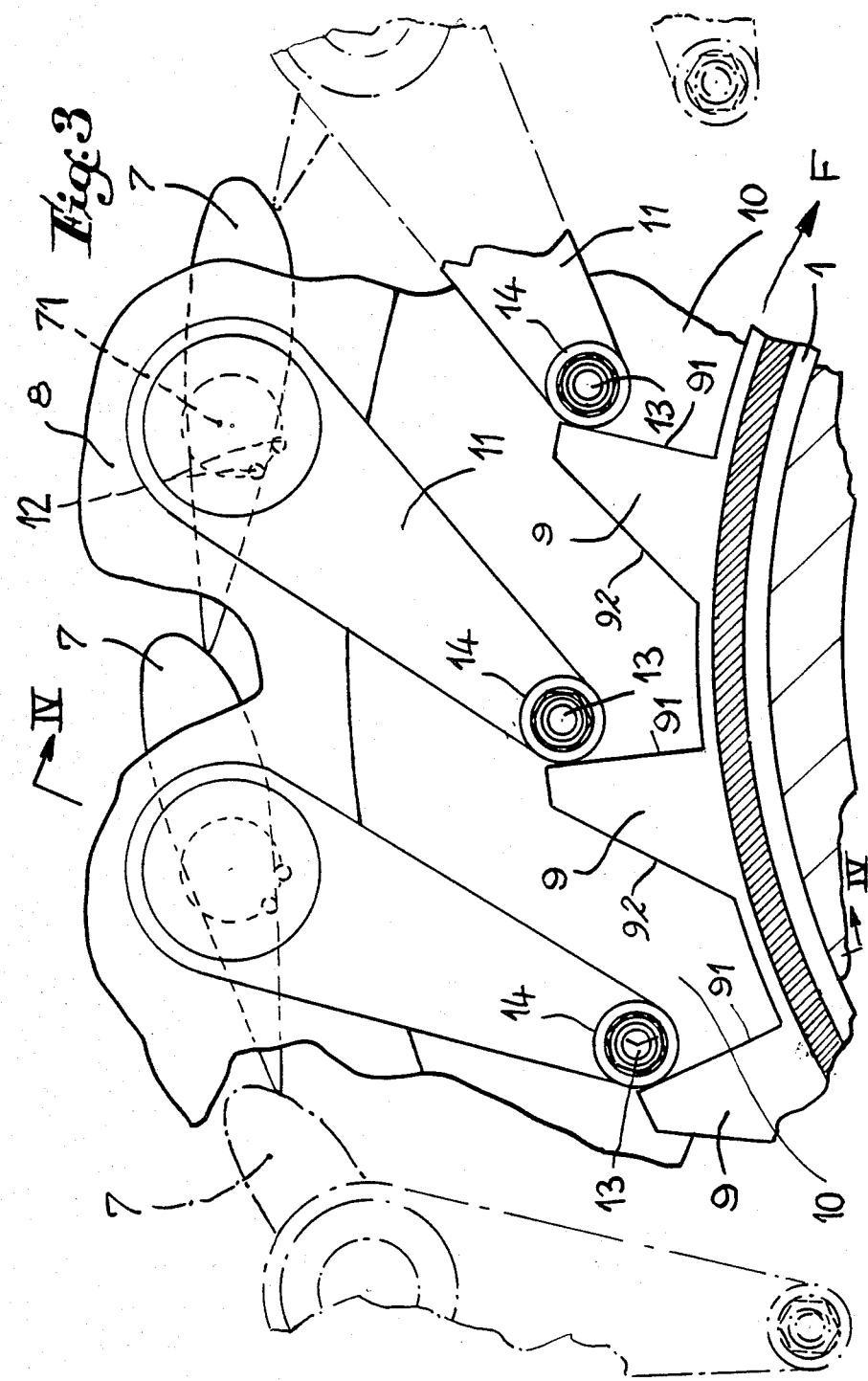

FIG. 3 is a view similar to that of FIG. 1 but illustrating the embodiment according to the invention.

Figure 4:
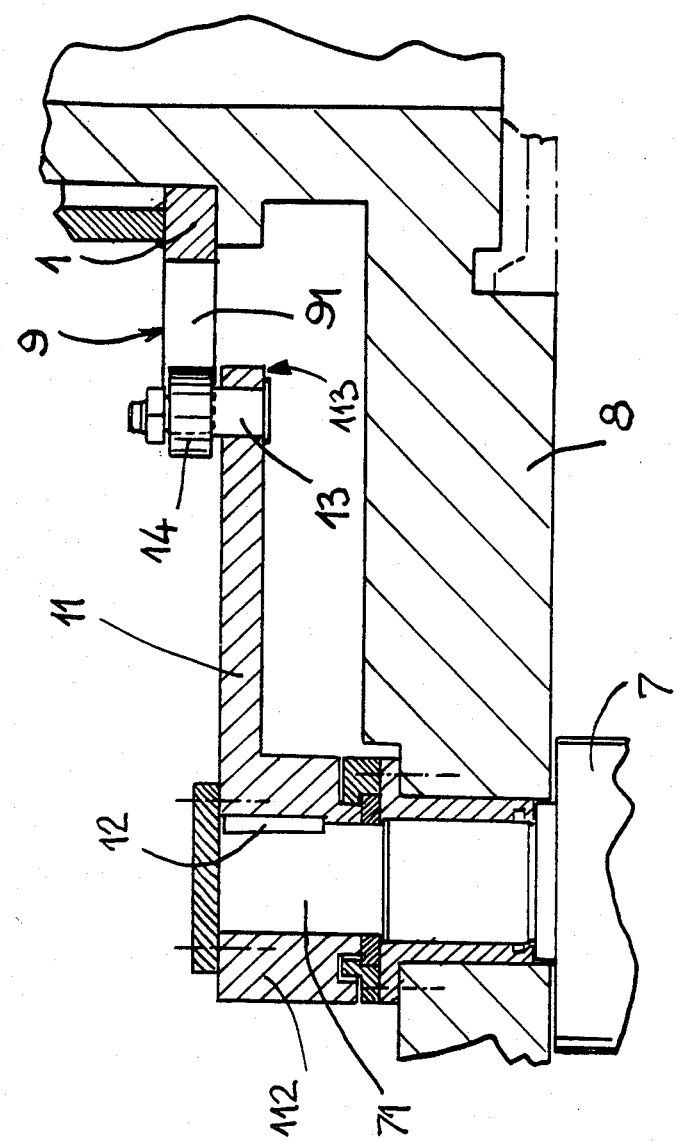

FIG. 4 is a section thereof along III-III.

DESCRIPTION OF THE PREFERRED EMBODIMENT

Figure 2:
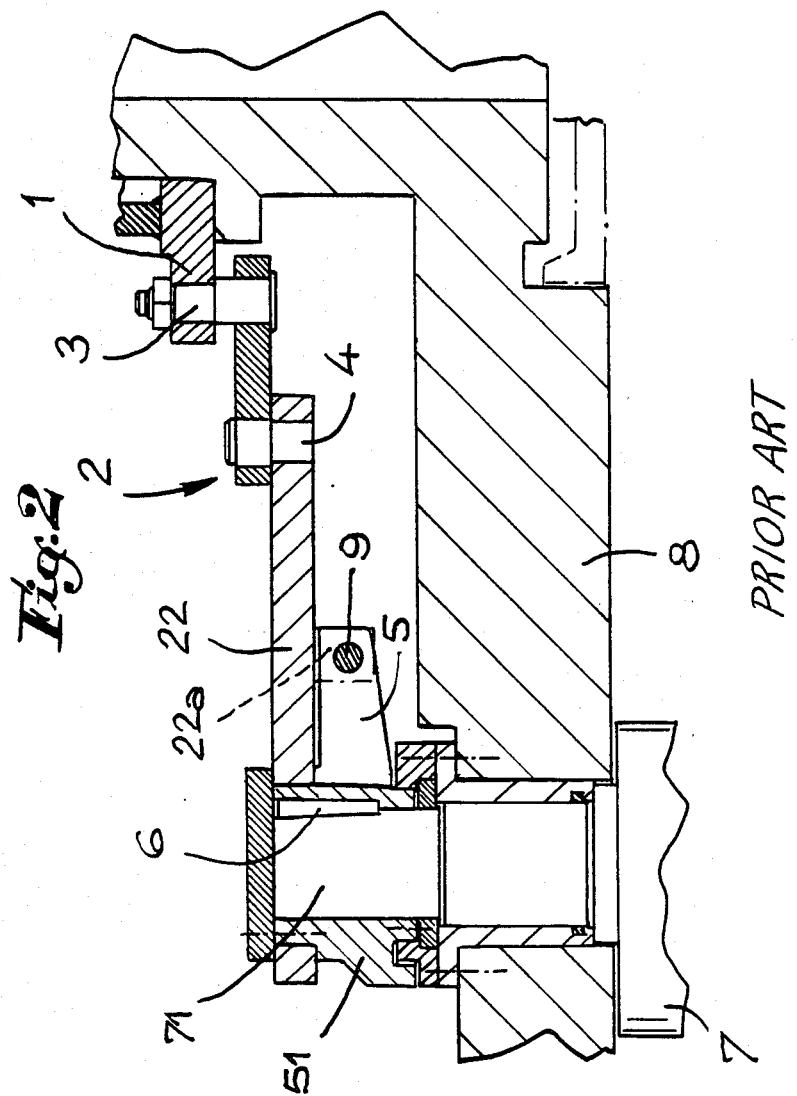
FIG. 2 is a section thereof along II—II.

Referring now to the drawings, in the heretofore known embodiment illustrated in FIGS. 1 and 2, a distributor of a hydraulic machine such as a turbine comprises a gating ring 1 driven in rotation by any known appropriate means from a speed regulator (not shown), for the purpose of effecting synchronization of the elements of this distributor. To that end, the gating ring 1 is associated with a certain number of rod-crank assemblies referenced 2 and which each comprise a rod 21 articulated at one end about a shaft 3 and, at the other end, on a crank 22 about a shaft 4. The crank 22 is further mounted to rotate freely with respect to the hub 51 of a lever 5 which is itself angularly fitted by means of a pin 6 or the like with respect to the journal 71 of each guide vane 7. It will be observed that the journal 71 hermetically passes through a side element 8 with the result that, if the guide vane is in the sunk compartment, on the contrary, its control mechanism is in a dry chamber.

According to the known technique, the connecting rod 22 carries a tab 22a disposed opposite the end of the lever 5. These two parts are open and traversed by a bolt 9 which forms a break member when too high efforts appear between the guide vane and its control member.

According to the invention (FIGS. 3 and 4), the gating ring 1 is provided with radial tabs 9 which extend from its periphery and each comprise in particular a ramp 91 whose role will be explained hereinafter. The other edge 92 of each tab 9 is very oblique, so as to constitute between edge 91 of one tab 9 and that, 92, of the adjacent ones, a space 10 which is as wide as possible.

The assembly of each guide van is identical to that illustrated in FIGS. 1 and 2 and these component elements will not be described as they are well known in the art. The guide vane 7 lies, of course, in the submerged compartment while the outer end of its journal 71 lies in a dry chamber. On this outer end is angularly fitted the hub 112 of a lever 11. Such angular fitting may be effected by cotter pins, longitudinal pins, etc. In the case shown, two longitudinal pins 12 have been illustrated. The lever 11 comprises a second free end 113 supporting a fixed shaft 13 around which a roller 14 is mounted to roll freely. It is observed in FIG. 4 that the roller 14 lies exactly opposite the edge or ramp 91 of each tab 9.

Operation follows from the foregoing explanations:

Being given, as explained hereinabove, that the guide vanes 7 tend to close, i.e. adopt the positions illustrated in FIG. 3, under the hydrodynamic effects or the like, in the closed state the ring 1 lies in an angular position in which the ramps 91 are in abutment on the rollers 14 but without acting thereon.

When it is desired to open the distributor, the ring 1 is displaced angularly in the direction of arrow F, so that the ramps 91, on acting on the rollers 14, cause the angular displacement of the guide vanes 7.

When it is desired to close the distributor, it suffices to return the ring 1 rearwards and the efforts which load the guide vanes displace the latter and take them into the position of FIG. 3.

In the event of a mishap, i.e. when an obstacle engages between two guide vanes when the distributor is open, if a need for closure becomes apparent, the ring 1 will be turned in the direction opposite that of arrow F, with the result that all the rollers will continue to cooperate with the ramps, except the one which corresponds to the jammed guide vane, of which the end 113 of the lever will be housed in space 10.

By means of appropriate instruments, it will be detected that one of the guide vanes remains open and it suffices to open the distributor wide, manually or automatically, for the obstacle to disappear without any manual intervention at the level of the guide vanes, as the wide opening of the distributor allows natural evacuation of this obstacle. The opening of the guide vanes is then returned to the desired adjustment.

A device has thus been produced which considerably simplifies the control and synchronization of the guide vanes of a distributor of hydraulic machines of which the control of the gating is with single effect, this considerably simplifying the kinematic chain and the regulation circuit. In addition, elimination of the break element of the connecting rod/crank assembly 2 and of lever 5 considerably reduces the general cost price of the distributor.

It goes without saying that shafts 13 of the pins 14 of levers 11 are oriented parallel to the geometrical axis of the wheel of the turbine in the case of a cylindrical distributor, while the shafts comprise intersecting geometrical axes at the intersection of the geometrical axis of the wheel and that of the journals 71 of the guide vanes 7 in the case of a conical distributor.

It must, moreover, be understood that the foregoing description has been given only by way of example and that it in no way limits the domain of the invention which would not be exceeded by replacing the details of execution described by any other equivalents.

What is claimed is:

1. A device for controlling and synchronizing the guide vanes of a distributor of a hydraulic machine wherein the guide vanes each have a journal, comprising, a rotating ring, a number of spaced tabs extending outwardly from said rotating ring, said number of spaced tabs being equal to the number of guide vanes, a plurality of levers having first and second ends, each of said second ends of said levers being connected with one of said journals of the guide vanes, each of said tabs being spaced apart so as to define an area therebetween, each of said tabs having one radially extending edge defining a ramp, said first end of said levers being normally biased toward an engagement with one of said ramps by hydrodynamic forces applied against the guide vanes, said first ends of said levers being moveable into said spaces between adjacent tabs in response to a blockage of the guide vane connected to the second end thereof.

2. The device of claim 1 including roller means secured to said first end of each of said levers, said roller means being freely rotatable with respect to said ramps.

3. The device of claim 2 in which the distributor is a cylindrical distributor having a turbine mounted along an axis, each of said roller means being carried by a shaft connected to said first end of said levers, said shafts being oriented parallel to said axis of said turbine.

4. The device of claim 2 wherein the distributor is a conical distributor having a turbine located along an axis, each of said roller means being carried by shafts extending from said first end of said levers, said shafts being oriented so as to intersect said axis of the turbine.

5. The device of claim 2 wherein each of said tabs includes an oblique edge portion which is oppositely oriented with respect to said ramp, each of said spaces being defined by a ramp of one tab and the oblique edge of an adjacent tab.

* * * * *